(12) United States Patent
Murray (10) Patent No.: US 9,313,023 B1
(45) Date of Patent: Apr. 12, 2016

(54) FORMAT-PRESERVING CIPHER

(71) Applicant: Zettaset, Inc., Mountain View, CA (US)

(72) Inventor: Eric A. Murray, Los Gatos, CA (US)

(73) Assignee: ZETTASET, Inc., Mountain View, CA (US)

( * ) Notice: Subject to any disclaimer, the term of this patent is extended or adjusted under 35 U.S.C. 154(b) by 20 days.

(21) Appl. No.: 14/557,464

(22) Filed: Dec. 2, 2014

(51) Int. Cl.
*H04L 9/18* (2006.01)
*H04L 9/06* (2006.01)
*H04L 9/14* (2006.01)
*H04L 9/34* (2006.01)

(52) U.S. Cl.
CPC ............... *H04L 9/0618* (2013.01); *H04L 9/14* (2013.01); *H04L 2209/24* (2013.01); *H04L 2209/34* (2013.01)

(58) Field of Classification Search
CPC .......... H04L 9/0618; H04L 9/18; H04L 9/065
See application file for complete search history.

(56) References Cited

U.S. PATENT DOCUMENTS

| | | | |
|---|---|---|---|
| 7,864,952 B2 | 1/2011 | Pauker et al. | |
| 8,307,206 B2 | 11/2012 | Ahuja et al. | |
| 8,605,897 B2 | 12/2013 | Golic | |
| 2006/0227965 A1 | 10/2006 | Zhu et al. | |
| 2008/0310624 A1 | 12/2008 | Celikkan et al. | |
| 2009/0310778 A1 | 12/2009 | Mueller et al. | |
| 2011/0103579 A1* | 5/2011 | Martin | G06F 21/602 380/28 |
| 2011/0280394 A1* | 11/2011 | Hoover | H04L 9/0618 380/28 |
| 2013/0168450 A1* | 7/2013 | von Mueller | H04L 9/28 235/449 |
| 2014/0108813 A1 | 4/2014 | Pauker et al. | |

FOREIGN PATENT DOCUMENTS

EP 1209550 A2 5/2002

OTHER PUBLICATIONS

Bellare, M. et al., "The FFX Mode of Operation for Format-Preserving Encryption", Dept. of Computer Science, University of California, San Diego, Feb. 20, 2010, pp. 1-18, USA.
Black, J. et al., "Ciphers with Arbitrary Finite Domains", Dept. of Computer Science, University of Nevada, Reno, 2013, pp. 1-17, USA.
Gutmann, P., Peter Gutmann on Google Groups, Jan. 26, 1997, pp. 1-3.
Krishnamurthy, S., "Revices Letter of Assurance for Essential Patent Claims: FFX Mode of Operation for Format-Preserving Encryption", Voltage Security, Apr. 2, 2013, pp. 1-3, USA.

(Continued)

*Primary Examiner* — Venkat Perungavoor
(74) *Attorney, Agent, or Firm* — Marek Alboszta (57) ABSTRACT

A format-preserving cipher including an encryption and a decryption scheme supporting non-linear access to input data by allowing the selection of portions of data from a potentially larger dataset to be encrypted, thus avoiding a necessarily sequential access into the input plaintext data. The cipher first defines a forward mapping from the allowable ciphertext values to an integer set of the number of such allowable ciphertext values, and a corresponding reverse mapping. It also supports exclusion of a certain set of characters from the ciphering process. Further, the encryption algorithm can encrypt the input plaintext data while preserving its original format and length and a corresponding decryption algorithm. The cipher advantageously embodies the encryption and decryption of multi-byte values or strings of data, thus fitting a variety of industrial needs.

10 Claims, 6 Drawing Sheets

(56) References Cited

OTHER PUBLICATIONS

Liu, A., "Letter of Assurance for Essential Patent Claims: FFX Mode of Operation for Format-Preserving Encryption", VERIFONE, 2009, pp. 1-3, USA.

Morris, B. et al., "How to Encipher Messages on a Small Domain Deterministic Encryption and the Thorp Shuffle" Dept. of Mathematics, University of California, Davis, Advances on Cryptography, 2009, pp. 1-29, USA.

\* cited by examiner

FORMAT-PRESERVING CIPHER

FIELD OF THE INVENTION

This invention relates generally to the field of data security and cryptography and in particular to developing ciphering systems that can encrypt and decrypt data while preserving the format of the data.

BACKGROUND ART

Information and data security is an active field of academic and industrial pursuit. With the news of exploitation of software vulnerabilities by hackers and data breaches a commonplace occurrence, it is unsurprising that many academic and professional institutions are focusing their efforts to develop tools, practices and frameworks that aim to make Information Technology (IT) eco-systems more secure against exploitative attacks from domestic and global hackers and adversaries. Cryptography provides indispensable tools to enable data security in an IT environment. The discipline of cryptography is old and established with many different techniques and processes developed over the years.

A common problem when encrypting data and fields in databases is the resulting format of the encrypted data or ciphertext. The input data or plaintext is expected to be in a certain range of values, for example alphanumeric characters or American Standard Code for Information Interchange (ASCII) numbers for databases. However, ciphertext usually consists of bytes that can have any value from 0 to the maximum possible value (i.e. 255 for an 8 bit byte). These out-of-range bytes can break existing routines that process the encrypted data assuming that it was plaintext. A related problem is the size of the plaintext. Database columns are specified for the expected plaintext size. For example, credit card numbers have at most 16 characters each consisting of the ASCII values "0" to "9". Therefore, while developing ciphering algorithms it is desirable to develop such algorithms so that they retain the forward integrity of the IT eco-system where they are deployed by preserving the format of the data that they encrypt.

In as far as producing a cipher algorithm that preserves the format of the original data, there are many teachings available in the prior art. U.S. Publication No. 2006/0227965 A1 to Zhu et al. teaches a scheme for producing a compliant ciphertext for general syntax specification using a secure syntax compliant encryption schema and "locally iterative encryption". In one implementation, an engine partitions a data stream into blocks, and encrypts each block iteratively until syntax compliance conditions are met. A system using the schema can utilize either stream ciphers or block ciphers in different modes. Locally iterative encryption methods are fast and remain at approximately the same speed even as the length of the data stream to be encrypted increases. Besides providing superior processing speed, the locally iterative encryption schema is said to be more robust to errors in the resulting ciphertext and in the resulting decrypted plaintext than conventional syntax compliant encryption techniques. Locally iterative encryption is secure as long as an underlying encryption cipher selected for use in the schema is secure.

U.S. Pat. No. 7,864,952 to Pauker et al. teaches a data processing system that includes format-preserving encryption and decryption engines. A string that contains characters has a specified format. The format defines a legal set of character values for each character position in the string. During encryption operations with the encryption engine, a string is processed to remove extraneous characters and to encode the string using an index. The processed string is encrypted using a format-preserving block cipher. The output of the block cipher is post-processed to produce an encrypted string having the same specified format as the original unencrypted string. During decryption operations, the decryption engine uses the format-preserving block cipher in reverse to transform the encrypted string into a decrypted string having the same format.

U.S. Publication No. 2008/0310624 A1 to Celikkan et al. teaches an encryption apparatus and method for providing an encrypted file system. The encryption apparatus and method of the illustrative embodiments uses a combination of encryption methodologies so as to reduce the amount of decryption and re-encryption that is necessary to a file in the encrypted file system in the event that the file needs to be modified. The encryption methodologies are interleaved, or alternated, with regard to each block of plaintext. In one illustrative embodiment, Plaintext Block Chaining (PBC) and Cipher Block Chaining (CBC) encryption methodologies are alternated for encrypting a sequence of blocks of data. The encryption of a block of plaintext is dependent upon the plaintext or a cipher generated for the plaintext of a previous block of data in the sequence of blocks of data so that the encryption is more secure than known Electronic Code Book encryption methodologies.

U.S. Pat. No. 8,307,206 to Ahuja et al. teaches a scheme of cryptographic policy enforcement where objects can be extracted from data flows captured by a capture device. In one embodiment, the invention includes assigning to each captured object a cryptographic status based on whether the captured object is encrypted. In one embodiment, the invention further includes determining whether the object violated a cryptographic policy using the assigned cryptographic status of the object.

U.S. Pat. No. 8,605,897 to Golic teaches a symmetric-key encryption method for transforming a sequence of plaintext symbols into a sequence of ciphertext symbols, includes an iterative encryption process including: computing an altered current internal state by combining a current internal state with a current memory symbol; computing a next internal state from the altered current internal state; generating a key-stream symbol from the next internal state; verifying whether the generated key-stream symbol satisfies a condition related to data-format/syntax rules; iteratively computing next internal states and iteratively generating key-stream symbols; and iteratively encrypting plaintext symbols by employing next key-stream symbols to obtain the sequence of ciphertext symbols.

Figure 1:
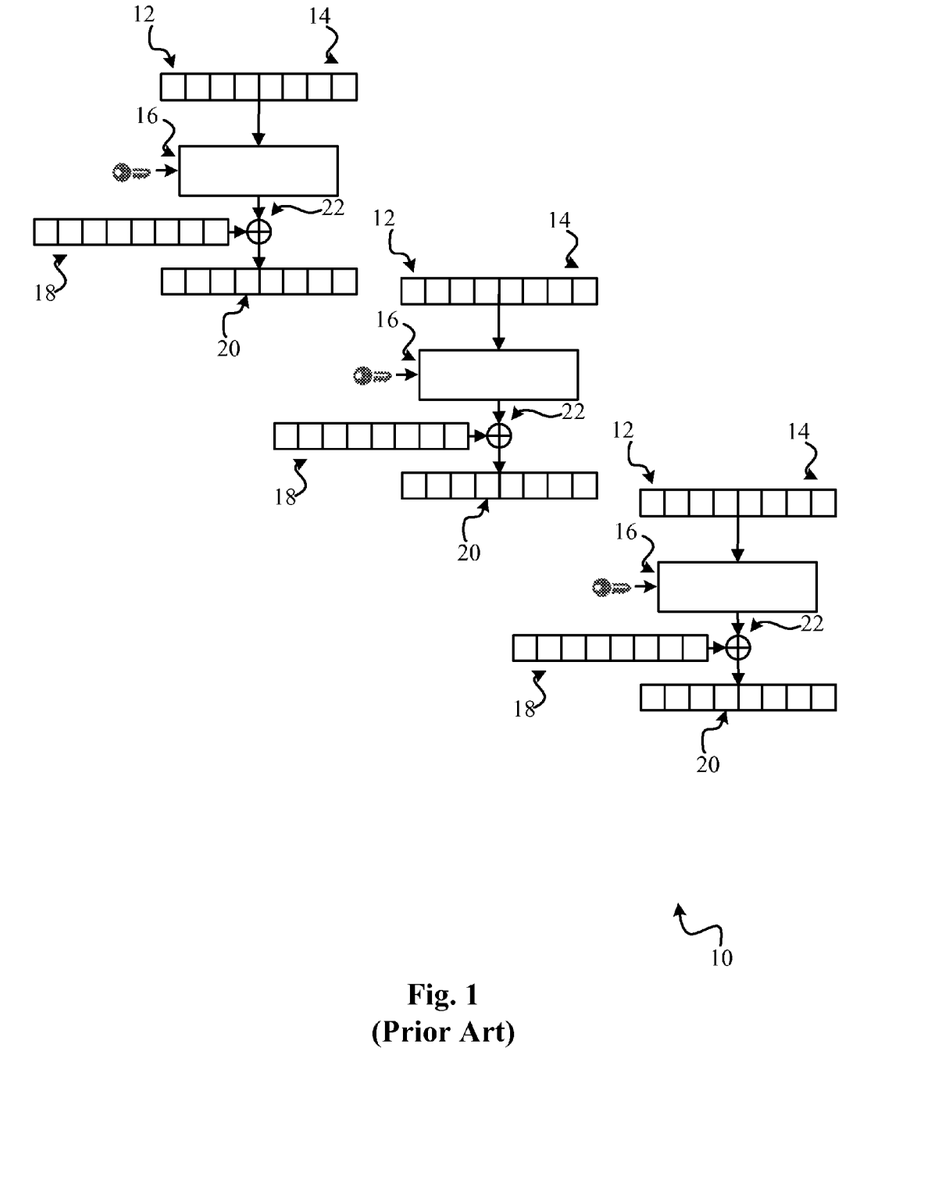
FIG. 1 is a functional view of encryption performed by a block-cipher in Counter (CTR) mode in the prior art.
Figure 2:
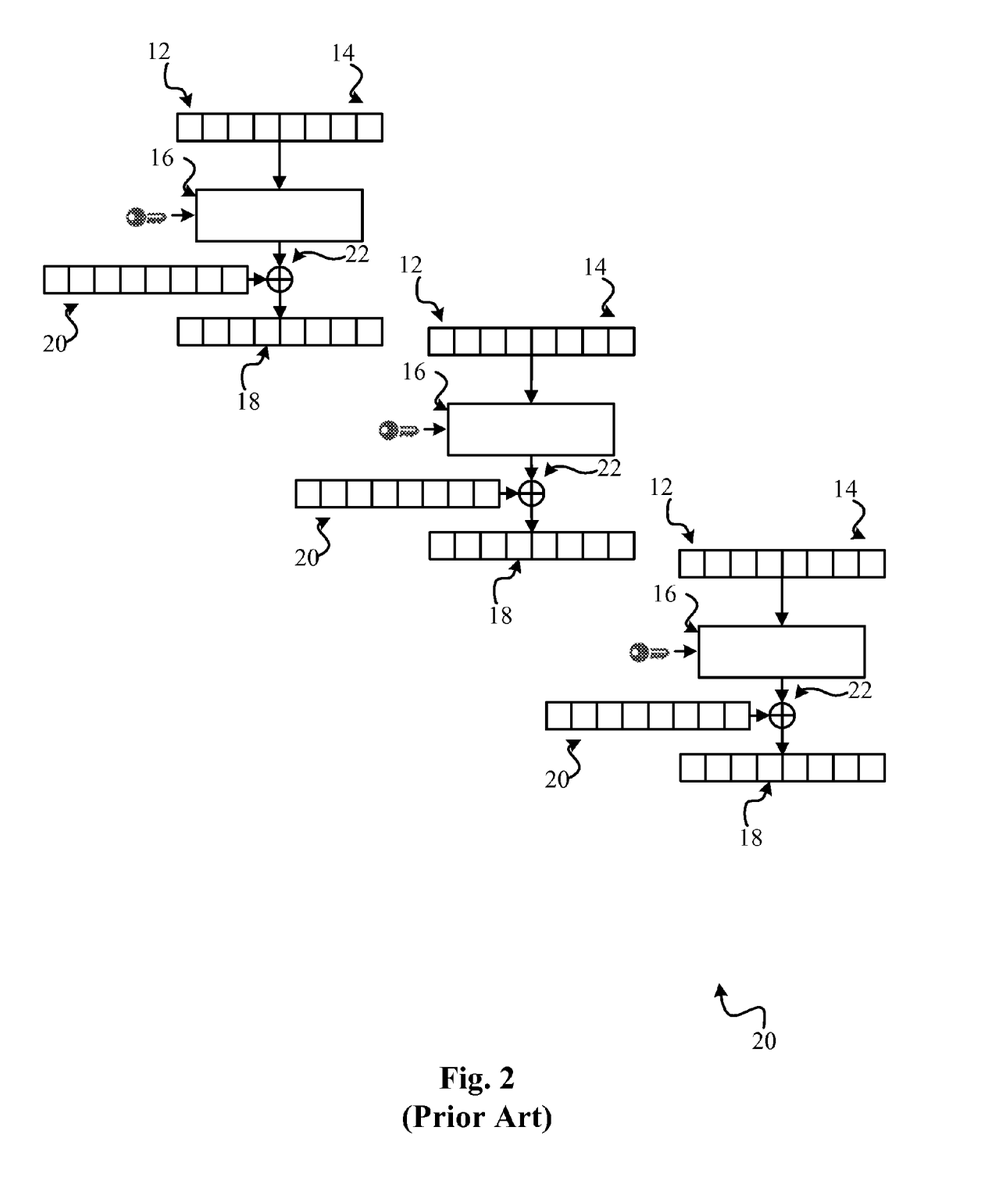
FIG. 2 is a functional view of decryption performed by a block-cipher in Counter (CTR) mode in the prior art.

As will be known to persons skilled in the art that there are many existing cipher algorithms that can operate in block or stream mode to encrypt and decrypt data. One such popular scheme is a block-cipher running in Counter (CTR) mode as depicted in the encryption mechanism 10 and decryption mechanism 20 of prior art FIG. 1 and FIG. 2 respectively. Encryption mechanism 10 initially combines a nonce 12 with a counter 14, and uses encryption 16 to encrypt this combination with a cryptographic key as shown to produce a key-stream block, which is then Exclusively OR'ed (XOR'ed) with successive bytes of plaintext data stream 18 to produce ciphertext 20. Conversely, decryption mechanism 20 combines nonce 12 with counter 14, and uses cryptographic encryption 16 to produce a key-stream that is XOR'ed with ciphertext 20 to retrieve original plaintext data 18.

A shortcoming of the prior art teachings is that they do not allow encrypting and decrypting data in a random-access or non-linear fashion. The prior art teachings do not allow for a predetermined selection of data from amongst an entire dataset prior to the ciphering process. Such a scheme would have the benefit that a ciphering engine will not need to encrypt and decrypt the entire dataset thereby resulting in performance improvement and streamlining of IT processes. Furthermore, teachings of the prior art fail to show a mechanism that can take multi-byte values of input plaintext data, where those multi-byte values may or may not be contiguous, and encrypt them into ciphertext or conversely take ciphertext data and decrypt it into corresponding potentially non-contiguous, multi-byte values of plaintext data. Such a scheme would have the benefit of encoding strings of characters or numbers that have special meanings in the context of specific industrial applications and where validation checks downstream from the cipher would preclude the existence of 'invalid' combinations of such string of characters or numbers.

OBJECTS OF THE INVENTION

In view of the shortcomings of the prior art, it is an object of the present invention to teach methods that allow the selection of portions of the data to be encrypted or decrypted from the entire dataset based on predetermined criteria, prior to the ensuing of the ciphering process.

It is further an object of the instant invention to teach methods that would allow an efficient way to encrypt and decrypt multi-byte data values in a format-preserved manner.

SUMMARY OF THE INVENTION

The objects and advantages of the invention are secured by methods of format-preserving encryption and decryption. The invention teaches how to build a cipher that will encrypt a dataset while preserving the format of the original data.

The invention allows the selection of the portions of plaintext or original data to be encrypted. Such portions of data could be selected from potentially a much larger data set based on predetermined criteria. The invention then teaches the determination of the allowable values permitted in the output or ciphertext. It is these allowable ciphertext values that enable the preservation of the format of the original data in the ciphertext. It then creates a forward mapping of the allowable ciphertext values to a set of integer values, and also the creation of a reverse mapping i.e. from the set of given integer values to the corresponding allowable ciphertext values. Of course, the encryption and decryption engines of the cipher being taught by the present invention need to agree on these forward and reverse mappings a priori before the commencement of ciperhing.

Data is encrypted and decrypted by the cipher taught by the invention in certain increments or number of bits, let us say S bits. The invention then determines a limiter value as the difference of the maximum number representable in S bits, and the maximum number representable in S bits modulo the number of allowable values in the ciphertext. The cipher taught by the current invention then iterates over the input data or plaintext, and a key-stream. Preferably, the key-stream is chosen to be the familiar block-cipher in CTR mode used as a key-stream generator, or an RC4 key-stream.

The invention allows for defining a set of values represented by the S bits in which input data and the key-stream are accessed, to be skipped during the ciphering process. In other words, if certain characters from the input data are to bypass the encryption or decryption processes, the cipher algorithms of the present invention allow such 'excluded' values to be specified. As data and key-stream are iterated over, the algorithm ignores the values of the key-stream that are greater than or equal to the limiter value calculated above. This is crucial to ensure that the ciphertext values will be within the bounds of the allowable of ciphertext values as specified prior to the initiation of the cipher.

The cipher allows for both encryption and decryption capabilities to be implemented according to the claims of the invention. Specifically, as input data and key-stream is iterated over, encryption of input or plaintext data is accomplished by taking the sum of the forward mapping of the currently accessed chunk of input data and the current key-stream value, then taking modulo 10 of this sum thereby producing a final sum, and finally taking the forward mapping of this final sum to produce the format-preserved encrypted value corresponding to the current chunk of input or plaintext data. Conversely, decryption of an encrypted chunk of data is accomplished by taking the difference of the forward mapping of currently accessed chunk of input ciphertext data and the current key-stream value, then taking modulo 10 of this difference. If this difference is less than 0, adding the number of allowable ciperhtext values to this difference to produce a final difference value, and finally taking reverse mapping of this final difference to reproduce the original plaintext data.

As mentioned above, the invention allows for determination of the portions of data from a potentially much larger dataset to be selected for the ciphering process thereby making the data access regime of the cipher of the current invention non-linear. The methods of the invention further teach preferred embodiments well suited for a number of applications in the data security industry. In a preferred embodiment the ciphertext produced by the invention is alphanumeric. Preferably, the number of bits in which chunks of data and key-stream is accessed is 8, thereby conforming to the specifications of the commonly used byte-oriented architectures of the present day IT systems.

Preferably, the invention allows for the specification of an exclusion-list of certain combinations of input bits to be excluded from the ciphering process. In a character-oriented or byte-oriented architecture, such an exclusion-list preferably includes binary characters, unprintable characters, dashes, delimiting characters, etc. Not encrypting the excluded characters allows the ciphertext to maintain the format of the original plaintext. Preferably, the allowable ciphertext values used in the forward and reverse mappings as taught above are non-contiguous. This allows for operating an encryption regime that preserves a non-standard format of plaintext data that has characters segmented in various non-consecutive chunks of allowable and unallowable characters.

In a highly preferred embodiment, the invention allows for the specification of multi-byte values, or a string of allowable characters or values in the ciphertext. This feature is important because in certain encryption regimes only a certain combination or string of allowable characters or values are permitted to keep the integrity of the downstream business processes. For example, while encrypting credit card numbers, a valid banking institution code needs to have a certain value in order to pass the validation checks of business systems downstream from the cipher. It would be desirable to produce ciphertext values so that those downstream validation checks will not be violated, and the present invention allows for such a capability.

In another preferred embodiment the forward mapping from the allowable ciphertext values to the corresponding set of integers as taught above, does not pre-ordain a certain ordering of that set of integers. In yet another preferred embodiment, the invention does not impose the requirement of the predetermination of the portions of data from a potentially much larger dataset.

Clearly, the system and methods of the invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 3:
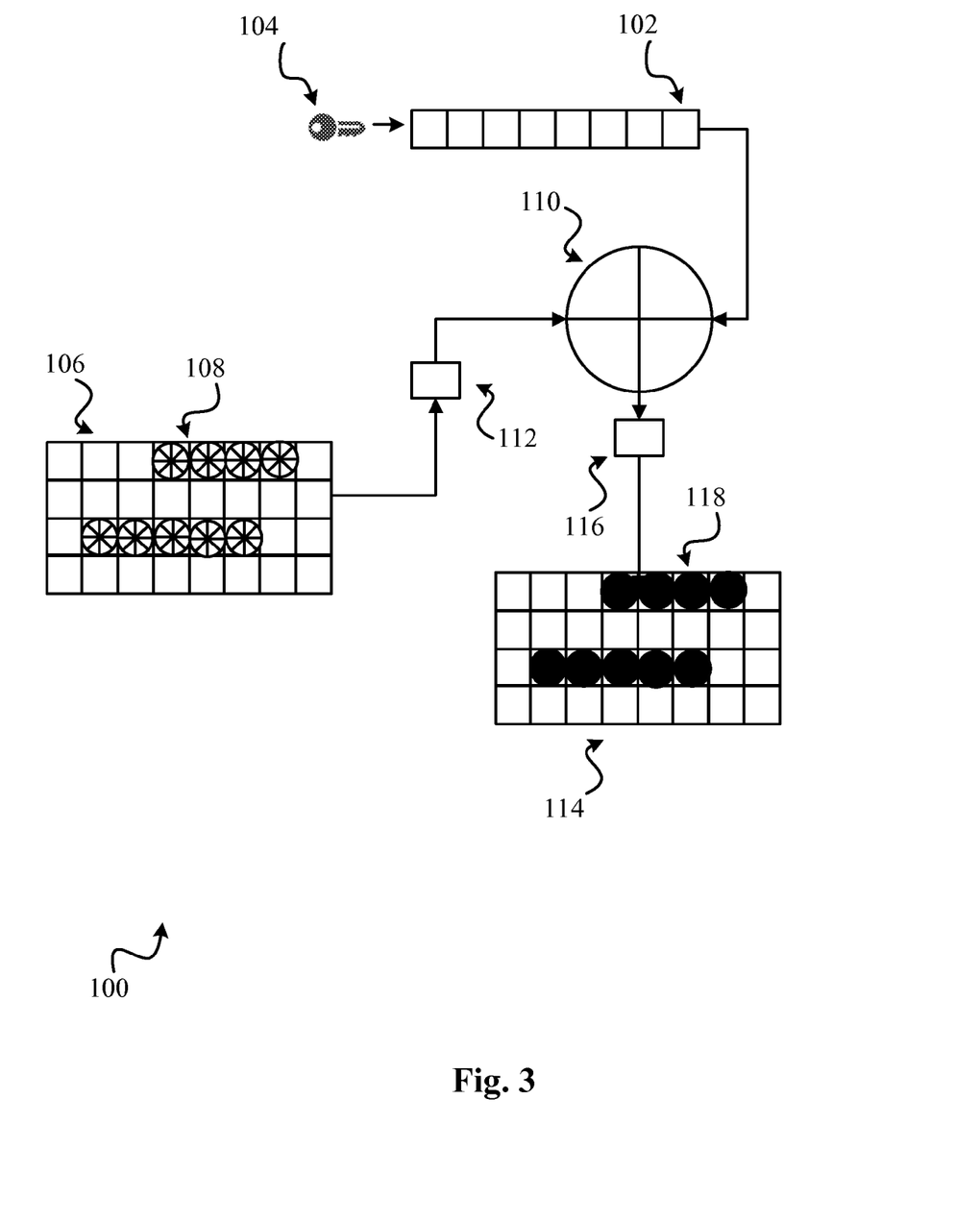
FIG. 3 is a functional view of encryption performed by the format-preserving cipher according to the present invention.
Figure 4:
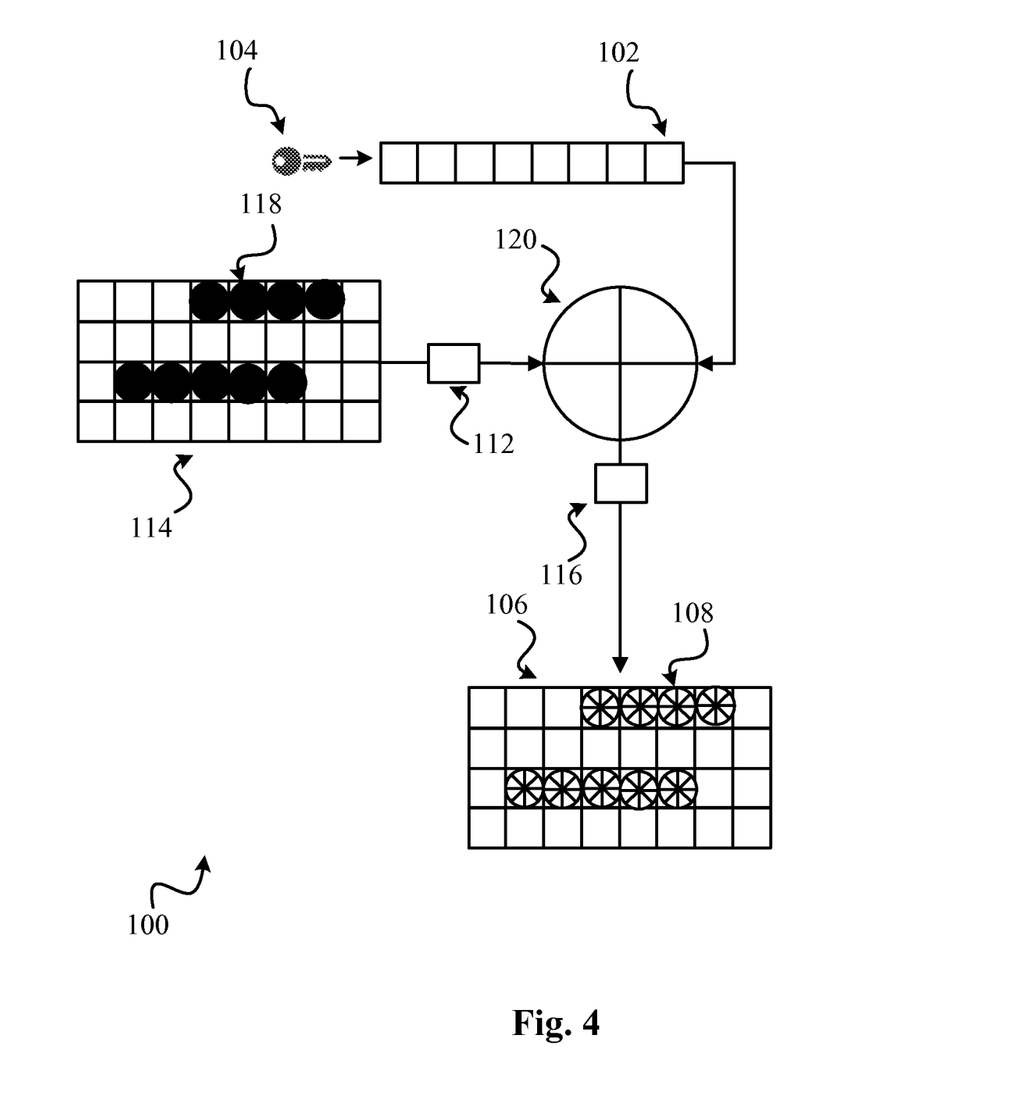
FIG. 4 is a functional view of decryption performed by the format-preserving cipher according to the present invention.

The present invention will be best understood by first reviewing the format-preserving cipher 100 according to the teachings of the current invention as illustrated in FIG. 3 and FIG. 4. The invention teaches how to build a cipher that will encrypt a dataset while preserving the format of the original data. FIG. 3 shows an encryption scheme that uses as input plaintext data 106 and key-stream 102 to produce ciphertext 114. According to the teachings of the current invention, input key-stream 102 can be produced by any existing popular methods, such as, a block-cipher using Counter (CTR) mode, that uses a cryptographic key 104 to encrypt a nonce (not shown) combined with a counter (not shown). Those familiar with the art will recognize that there are many alternative ways of producing a key-stream. For example, Rivest Cipher 4 (RC4), also known as Alleged RC4 or ARCFOUR, is another popular stream cipher that can be easily used by cipher mechanism 100 shown in FIG. 3.

Throughout the following explanation, reference to the input unencrypted data will be made as input plaintext data, original input data or simply plaintext data as is commonly understood in the industry. Similarly reference to encrypted data will be made as encrypted or ciphertext data as is known in the art. It should be noted, that although the term plaintext may seemingly imply that the input data can only be in textual form, the present invention and its teachings are not restricted to ciphering only textual data, but also any other type of data, such as, binary or non-printable data. Because the cryptographic industry refers to the input or unencrypted data as plaintext data, this convention will be adopted in the following teachings to be consistent with the skills and terminology of the art, and as mentioned, the instant invention does not impose any restriction on the format of the original input data.

As claimed by the present invention, cipher mechanism 100 of FIG. 3, first allows the selection of specific portions of data 108 from the overall plaintext dataset 106. In FIG. 3 and FIG. 4 the reference number 106 represents individual data bits or bytes of the entire dataset as squares, while the squares that are filled with circular wheels with cross bars, as denoted by reference number 108, represent bits or bytes of the actual fields or portions of input data that have been selected for the ciphering process.

This initial selection of parts of data to be encrypted is made on predetermined criteria which could be defined based on the requirements of the particular application requiring the format-preserving cipher of the present invention. This pre-selection is important because it lends the ability to the cipher to only encrypt or decrypt certain pieces of data that need to be secured, and not necessarily the entire plaintext dataset. For example, there may be Personally Identifiable Information (PII) or privacy data, such as a social security number (SSN), or Payment Card Industry (PCI) data such as a credit card number (CCN) embedded in the original plaintext dataset. It may not be efficient or possible to encrypt this entire data set, only a small portion of which is in fact really needed to be secured, in order to meet either external industry compliance requirements, e.g. that of PCI compliance, or an internal company dictate.

Therefore, the predetermined criteria for this initial selection can be based on data security requirements at hand. For example, the criteria could include searching for strings in the input plaintext data that match the format: "nnn-nn-nnnn", where each n denotes a numeric digit. In other words, the criteria searches for any strings of digits that has 3 digits before a dash "-", two digits after that, then another dash and then 4 digits after that. This search string or format represents a social security number. Similarly, the criteria could include searching for patterns like "nnnn nnnn nnnn nnnn", which would represent a search for strings of 16 digits, representing a Visa or Mastercard number and "Exp: mm/yyyy", which would represent a search for the expiration date of the credit card, and so on. People skilled in the art will recognize that one can construct a variety of regular expression searches that would search for a variety of PII, PCI, Healthcare, or other private data in the input plaintext dataset, as the predetermined criteria for selecting the exact portions of input data that need to be secured.

The present invention allows such a non-linear access to data so as to only encrypt or decrypt the specific pieces of data 108 that may indeed need to be protected. Once the pre-selected portions of data 108 are obtained from the overall plaintext dataset 106, the algorithm of the present invention iterates over the plaintext data 108 that needs to be encrypted and feeds this data, along with a keystream 102 to an encryption module 110. It will be understood by those skilled in the art that there are a variety of tools and techniques available to implement such a data access scheme to access portions of data 108 that need to be encrypted from the entire dataset 106 to encryption module 110. For example, one could have an array that is populated with portions 108 of data that are to be encrypted, along with pointers to where those portions 108 of data are located in the entire dataset 106, and then feed those entries of that array to encryption module 110. Such data access techniques are commonplace in the art and will not be discussed in detail in this specification, and are merely represented by process box 112 in FIG. 3.

Subsequently, as illustrated in FIG. 3, encryption module 110 encrypts input data 108 with a value from keystream 102 according to the teachings of the invention as will be explained below, to produce ciphertext 118. The ciphertext 118 is embedded into the original larger dataset 106, where unencrypted data 108 used to be, to produce protected dataset 114. Using our example above, one will take individual portions 118 of ciphertext and use the pointers stored in the above array to embed format-preserved ciphertext according to the current invention, into the original data set 106, to produce protected dataset 114 as illustrated in FIG. 3. Again, there are a number of tools and techniques available to those skilled in the art for such data insertion schemes to embedded ciphertext portions of data 118 into original dataset 106 and are merely represented by process box 116 in FIG. 3.

Conversely, as illustrated in FIG. 4, cipher mechanism 100 of the current invention has a corresponding decryption mechanism that takes encrypted or ciphertext data 118 from the overall protected dataset 114 obtained above, again using some familiar data access scheme as represented by 112, to access and feed portions of ciphertext data 118 that need to be decrypted along with keystream 102 to a decryption module 120. It then traverses over ciphertext data 118 and keystream 102 to produce plaintext data 108 that after reinsertion, again using a familiar data insertion scheme 116, into input dataset 106 at the original locations, results in the original plaintext dataset 106. In the following explanation, we will take a closer look at the abovementioned encryption and decryption schemes as taught by the current invention.

First to restate, a key advantage of the format-preserving encryption mechanism taught by the present invention is that it allows for non-linear access to input data to be encrypted. That is, the algorithm of the instant invention allows a selection of portions of data from a potentially much larger input plaintext dataset to be encrypted (and decrypted) by the downstream cipher based on a variety of predetermined criteria that may be suitable for a given application. Since there are generally small portions or strings of data that need to be protected in a typically large dataset, such a scheme would result in substantial performance improvements since the whole dataset does not need to be encrypted or decrypted. Specifically referring to FIG. 3 and FIG. 4, selected portions 108 may be a small subset of the overall dataset 106. Moreover, as stated above and will be obvious, the format preserving cipher of the present invention will produce encrypted portions of ciphertext 118 that have the same format and length as the corresponding input plaintext portions 108.

Let us turn our attention to the encryption and decryption cipher scheme claimed by the present invention. The parts of the scheme that are invoked each time an encryption or decryption operation of the present invention is performed are depicted by encryption module 110 in FIG. 3 and decryption module 120 in FIG. 4. Note that the below explanation teaches the various steps of the algorithm of the cipher of the instant invention. Skilled artisans will recognize that there will be several ways to implement the below algorithm. As such alternative arrangements of the below steps are possible in the light of a given implementation without deviating from the principles of the invention. For example, as claimed by the invention, steps of the algorithm that need to happen only once, do not need to be repeated in encryption module 110 or decryption module 120 for each encryption and decryption operation. These 'initialization' steps will be explained in the below teachings. Similarly, other optimizations of the algorithm are possible within the scope of the invention.

According to the format-preserving cipher taught by the present invention, a determination of the N allowable values permitted in the output or ciphertext is first made. Typically this determination stays 'static' during the course of the operation of an encryption/decryption regime. For example, if the format-preserving cipher of the present invention requires the preservation of alpha-numeric format, then these allowable values will be the characters "0" through "9", "a" through "z", "A" though "Z" and any other special characters such as dashes, etc. Such a requirement might exist to encrypt residential or commercial addresses as an example.

Alternatively if the intent is to keep the ciphertext in numeric form, as is the case for Social Security Numbers (SSN) or Credit Card Numbers (CCN), then these allowable values will be "0" through "9" and N will be 10. It is these allowable ciphertext values that enable the preservation of the format of the original data in the output ciphertext. After the determination of these N allowable values, the cipher then creates a forward mapping M of these allowable ciphertext values into a corresponding set of N integer values {0 . . . N−1}, and also the creation of a reverse mapping R from the given set of integer values {0 . . . N−1} to the corresponding N allowable ciphertext values. Of course, the encryption and decryption engines of the cipher being taught by the present invention need to agree on this forward mapping M and reverse mapping R a priori before the commencement of ciperhing operations.

Taking the numeric format-preserving encryption example above, the forward mapping M and reverse mapping R are represented in Table 1 and Table 2 below.

TABLE 1

| Char | Value | Mapping M |
|---|---|---|
| "0" | 48 | 0 |
| "1" | 49 | 1 |
| "2" | 50 | 2 |
| "3" | 51 | 3 |
| "4" | 52 | 4 |
| "5" | 53 | 5 |
| "6" | 54 | 6 |
| "7" | 55 | 7 |
| "8" | 56 | 8 |
| "9" | 57 | 9 |

TABLE 2

| Value | Char | Mapping R |
|---|---|---|
| 0 | "0" | "0" |
| 1 | "1" | "1" |
| 2 | "2" | "2" |
| 3 | "3" | "3" |
| 4 | "4" | "4" |
| 5 | "5" | "5" |
| 6 | "6" | "6" |
| 7 | "7" | "7" |
| 8 | "8" | "8" |
| 9 | "9" | "9" |

This example assumes that data is being encrypted in character sized chunks as will be the case of typical byte-oriented architectures of most computer systems. However the teachings of the present invention are agnostic to the size of such chunks and can be implemented in increments of any given number of bits, let us say S bits. The cipher algorithm then determines a limiter value L as the difference of the maximum number representable in S bits, and the maximum number representable in S bits modulo operation the number N of allowable values in the ciphertext. Mathematically, the limiter value L can be represented by the following equation:

$$L = 2^s - (2^s \text{ modulo } N)$$

The encryption mechanism taught by the current invention then iterates over the portions of input plaintext data that need to be encrypted as identified by reference number 108 in FIG. 3 according to above explanation. Similarly, the decryption mechanism taught by the current invention iterates over the portions of encrypted ciphertext data that need to be decrypted as identified by reference number 118 in FIG. 4 according to above explanation. Let us denote each accessed chuck of S bits of input plaintext data by $PT_j$ and each accessed chunk of encrypted ciphertext data as $CT_j$ where j is a traversal iterator or index over portion PT of plaintext data for encryption or corresponding portion CT of ciphertext data for decryption. The cipher also iterates over key-stream 102 in chunks of S bits. Let us denote each accessed chunk of S bits of key-stream 102 by $KS_i$ where i is a traversal iterator or index over key-stream KS. In other words, $KS_i$ and $PT_j$ respectively represent the ith key-stream value, and jth plaintext value during the encryption operation of input plaintext, and $KS_i$ and $CT_j$ respectively represent the ith key-stream value, and jth ciphertext value during the decryption operation of encrypted ciphertext. As taught above, preferably, the key-stream is chosen to be the familiar block cipher in CTR mode or an RC4 key-stream. It should be noted that any convenience key stream can be used within the scope of the present invention.

The format-preserving encryption and decryption mechanisms of the present invention further allow defining a set of values represented by the S bits in which input data and the key-stream are accessed, to be skipped during the encryption and decryption operations. In other words, if certain characters from the input data are to bypass the encryption or decryption operations altogether, the cipher algorithm of the present invention allows such 'excluded' values to be specified. An example use-case of such an exclusion-list would be dashes "-" of a social security number, thus ensuring that the format-preserving cipher of the present invention will produce encrypted social security numbers that are also in the format "nnn-nn-nnnn". Other examples could include the "." in the domain name of an email address.

As input data and key-stream values are iterated over as $PT_j$ and $KS_i$ respectively, the algorithm ignores the values of the key-stream that are greater than or equal to the limiter value L calculated above. This is required to ensure that the ciphertext values will be within the bounds of the allowable of ciphertext values as specified prior to the initiation of the cipher. Similarly, as input ciphertext data and key-stream values are iterated over as $CT_j$ and $KS_i$ respectively, the algorithm ignores the values of the key-stream that are greater than or equal to the limiter value L calculated above. Note, as convenient, we will use the terms input plaintext to represent data being fed to encryption module 110 of FIG. 3, and input ciphertext for encrypted ciphertext being fed to decryption module 120 of FIG. 4.

Let us now turn our attention to the implementation of encryption module 110 and decryption module 120 illustrated in FIG. 3 and FIG. 4 respectively. For encryption module 110 of FIG. 3, as input data 108 and key-stream 102 are iterated over as $PT_j$ and $KS_i$ respectively according to above explanation, encryption of input $PT_j$ is accomplished by taking the sum of the forward mapping M of the currently accessed chunk $PT_j$ of input data and the current key-stream value $KS_i$, then taking modulo 10 of this sum thereby producing a final sum, and finally taking the reverse mapping R of this final sum to produce the format-preserved encrypted value corresponding to the current chunk of input or plaintext data $PT_j$.

Conversely, for decryption module 120 of FIG. 4, decryption of ciphertext data 114 in a given chunk represented by $CT_j$ is accomplished by taking the difference of the forward mapping M of ciphertext value $CT_j$ and the currently accessed value of key-stream 102 represented by $KS_i$, then taking modulo 10 of this difference. If this difference is less than 0, adding the number N of allowable ciphertext values to this difference to produce a resultant value, and finally taking reverse mapping R of this resultant value to produce the original plaintext value PT for the corresponding ciphertext value $CT_j$.

The following pseudo-code represents one implementation of the above algorithm. As stated earlier, it is entirely conceivable to arrive at equivalent and alternative code for the implementation of the above taught cipher within the scope of the instant invention.

```
Encryption:
if KS_i >= L then
    i++ // ignore this key-stream value
else
    if PT_j != any value defined in the exclusion-list then // do
not encrypt values to be skipped
        p = M(PT_j)
        e = (p + KS_i) mod 10 // encrypt
        output R(e)
        i++ // advance to next key-stream byte
    else
        output PT_j // do not encrypt values to be skipped
    fi
    j++ // iterate to the next data value to be encrypted
fi.
```

```
Decryption:
if KS_i >= L then
    i++ // ignore this key-stream value
else
    if CT_j != any value defined in in the exclusion-list then //
do not decrypt values to be skipped
        p = M(CT_j)
        d = (p - KS_i) mod 10 // decrypt
        if d < 0
            d = N + d // subtract abs(d) from N
        output R(d)
        i++ // advance to next key-stream byte
    else
        output CT_j // do not decrypt values to be skipped
    fi
    j++ // iterate to the next data value to be decrypted
fi.
```

Figure 5:
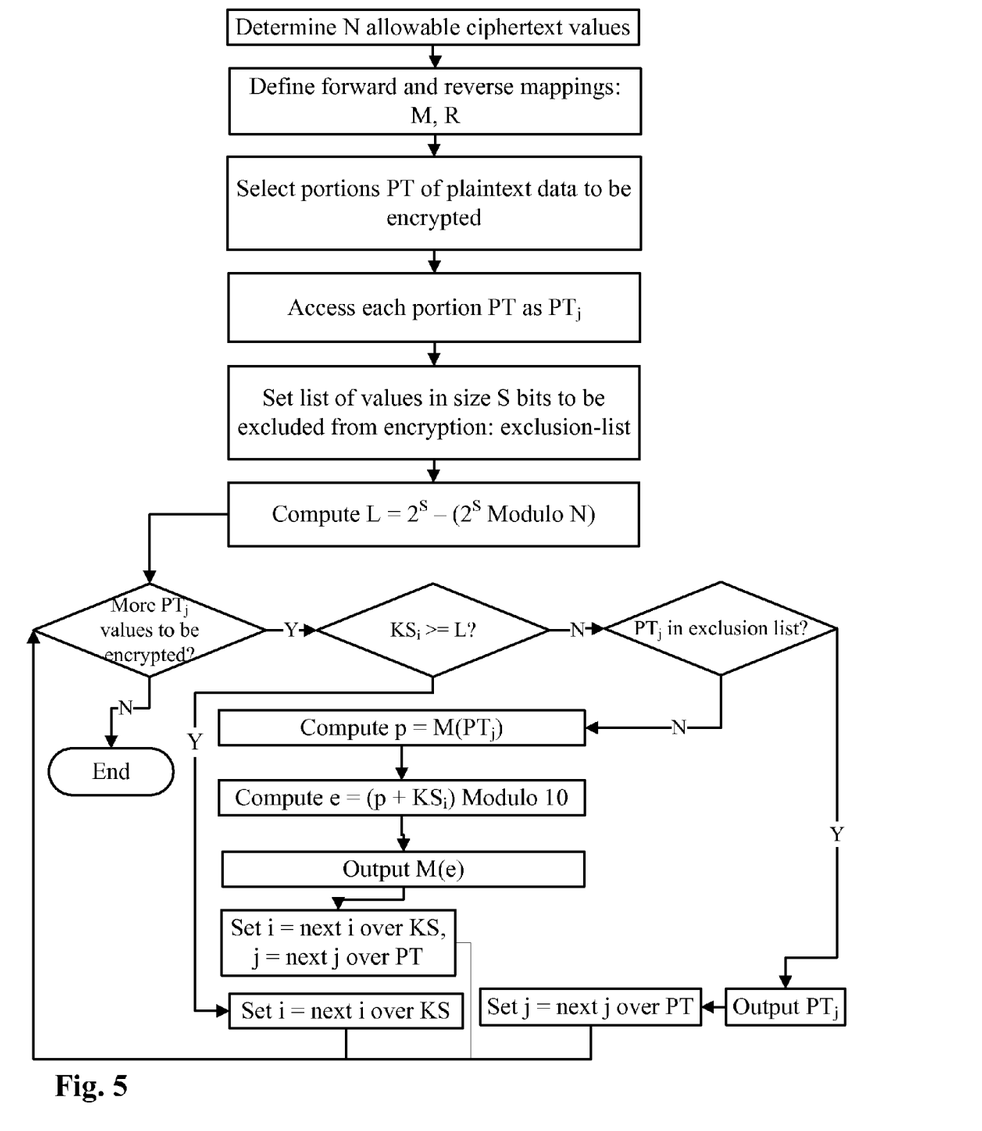
FIG. 5 shows in a flowchart form the steps required to perform encryption according to the format-preserving encryption mechanism taught by the present invention.
Figure 6:
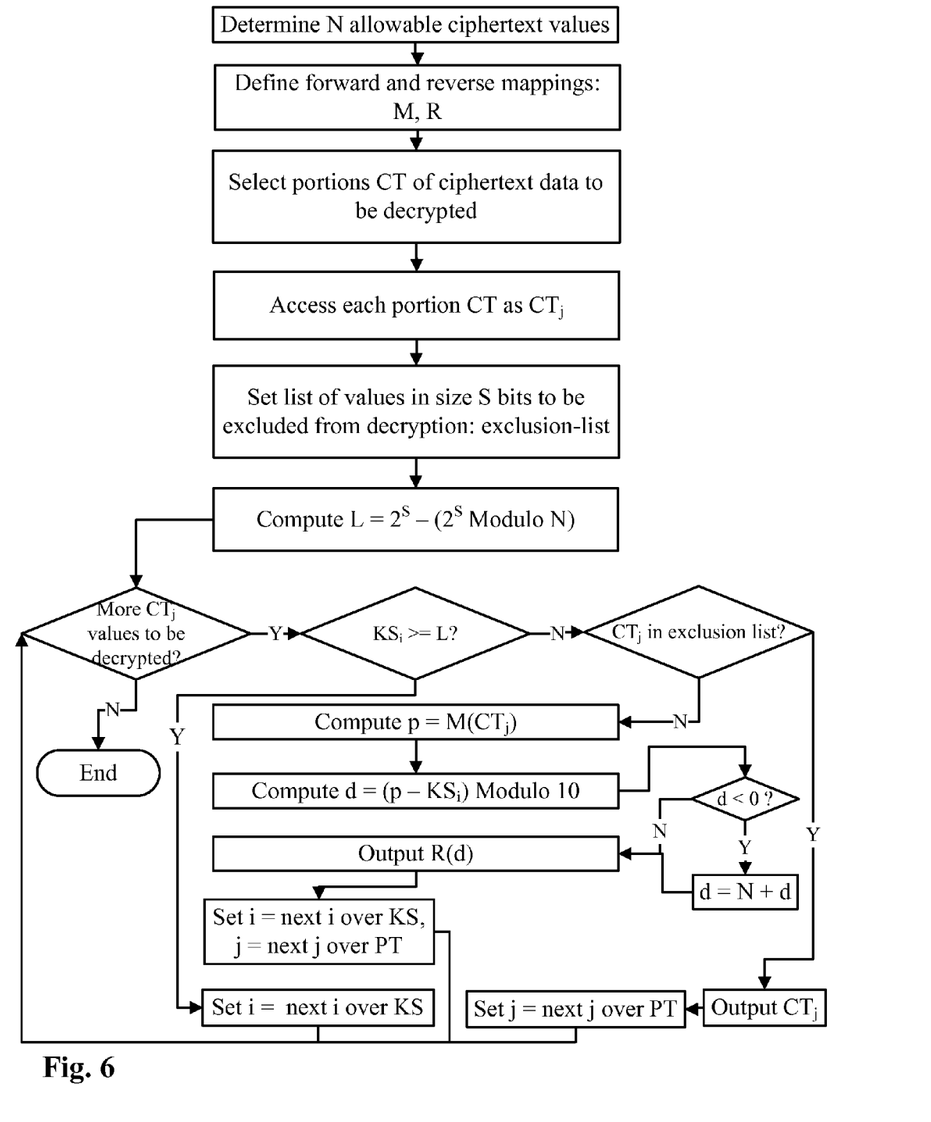
FIG. 6 shows in a flowchart form the steps required to perform decryption according to the format-preserving cipher mechanism taught by the present invention.

FIG. 5 and FIG. 6 show in a flowchart form the encryption and decryption algorithms respectively, of the format-preserving cipher taught by the current invention. Note that in FIG. 5 and FIG. 6, the initialization steps required to set up the initial parameters, including computing the value of limiter L and setting up the exclusion-list are performed first, and then encryption and decryption loops are executed. These loops containing the repeating steps of the cipher will indeed be encapsulated in the respective encryption module 110 of FIG. 3 and decryption module 120 of FIG. 4. It should be further noted, that in a given implementation the common initialization steps required for encryption and decryption may be merged into a common routine, let us say cipher, that can perform both encryption and decryption.

It will be understood by skilled artisans that if key-stream KS is exhausted prior to completion of encryption or decryption of the entire input plaintext or ciphertext datasets respectively, additional key-stream values can be generated depending on the specific algorithm used for key-stream cipher KS. For example, for the block-cipher CTR mode implementation of key-stream cipher, this will be accomplished by incrementing the counter for the CTR mode, and encrypting another block of the required chunk's size worth of nonce and counter combination with the cryptographic key used for the CTR mode.

The methods of the invention claim many preferred embodiments well suited for a number of applications in the data security industry. In a preferred embodiment the ciphertext 114 in FIG. 3 produced by the present invention is alphanumeric. This will be a familiar requirement for a lot of database applications requiring the preservation of alphanumeric format for the tables predefined in the database(s). Preferably, the number of bits S in which chunks of data and key-stream is accessed is 8, thereby conforming to the specifications of the commonly used byte-oriented architectures of the present day IT industry.

As taught above, the invention allows for the specification of an exclusion-list of certain combination of input bits from the ciphering process. In a character-oriented or byte-oriented architecture, such an exclusion-list preferably includes binary characters, unprintable characters, dashes, delimiting characters, etc. Preferably, the allowable ciphertext characters as taught above are non-contiguous. This allows for the specification of an encryption regime that can preserve a non-standard format that may have characters segmented in various chunks of non-consecutive allowable and unallowable values.

In a highly preferred embodiment, the invention allows for the specification of multi-byte values, or a string of allowable characters in the ciphertext. This feature is important because in certain encryption regimes only a certain combination or string of allowable characters or values are permitted to keep the integrity of the downstream business processes. For example, in a credit card number the first six digits, usually referred to as Issuer Identification Number (IIN) contain a valid banking institution code that needs to have certain values in order to pass the validation checks of business systems downstream from the cipher. It would be desirable to produce ciphertext values so that those downstream validation checks will not be violated, and the present invention allows for such a capability.

Taking the above example, the forward mapping M of multi-byte IIN values to the corresponding set of N allowable ciphertext values, according to the teachings of the present invention, is shown in Table 3 below, where values in the first column are exemplary values for valid IIN codes.

TABLE 3

| Value | Mapping M |
|---|---|
| "400610" | 0 |
| "400936" | 1 |
| "400937" | 2 |
| "400938" | 3 |
| "400941" | 4 |
| "400942" | 5 |
| "400844" | 6 |
| "401171" | 7 |

TABLE 3-continued

| Value | Mapping M |
|---|---|
| "401106" | 8 |
| ... | ... |
| "409311" | N − 1 |

Encryption and decryption proceed in the same manner as the previous embodiments except that size S of bits, as taught above, needs to be chosen such that when input plaintext data is accessed as $PT_j$ or ciphertext data is accessed as $CT_j$ according to the above algorithm, enough bits are accessed to ensure that the entire input multi-byte value can be encrypted or decrypted, and when key-stream KS is accessed as $KS_i$, enough bits of the key-stream are accessed so that they can be used to encrypt or decrypt the entire multi-byte value. This is accomplished by ensuring that S divided by 8 is equal to the number of bytes in each of the input multi-byte plaintext value. Of course, the assumption here is that these multi-byte values that need to be encrypted or decrypted are of fixed and equal lengths.

Given this scheme, in the example shown in Table 3 above, the multi-byte values are of 6 bytes in length, that means that S should be chosen to be 48 bits, so that 48 divided by 8 equals bytes, and $N=2^{48}-1$. The same method for calculating limiter value L is used as in earlier embodiments, that is:

$$L=2^s-(2^s \bmod N)$$

A single encryption would consume the 6 bytes of plaintext IIN and produce a 6 byte encrypted IIN. After the initial IIN has been encrypted, normal encryption process as explained for the earlier embodiments can resume, where S is selected to be of 'normal' size e.g. 8.

Additionally, as is known to skilled artisans, the last character of a CCN is a checksum of the previous digits. It is usually calculated using the Luhn algorithm. To make a fully legitimate appearing format-preserved encrypted CCN, the checksum would need to be recalculated on the encrypted value, using the checksum algorithm for that card which can be determined using the original IIN.

It will be obvious to those skilled in the art, that this embodiment can be used for encrypting any multi-byte values and not just credit card numbers, and can be invoked as and when desired during the course of normal character-based or byte-sized encryption regimes implemented by earlier embodiments, and once the desired multi-byte values have been encrypted, normal character-based or byte-sized cipher operations can resume. Of course, the converse is true for the decryption process.

In another preferred embodiment the forward mapping from the allowable ciphertext values to the corresponding set of integers {0 . . . N−1} as taught above, does not pre-ordain a certain ordering of that set of integers. That means, that as long as there is a unique forward mapping M from input ciphertext values to the set {0 . . . N−1} where the values of set {0 . . . N−1} can be in any order, and a corresponding reverse mapping R that uniquely maps values of the set {0 . . . N−1} in any order to the corresponding ciphertext values, the format-preserving cipher taught by the current invention will function properly. This further reduces complexity of implementation in the practice of the instant invention.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A method of format-preserving ciphering, comprising the steps of:
   a) providing predetermined criteria for selecting portions of data to be ciphered;
   b) providing a forward mapping from N allowable ciphertext values to set {0 . . . N−1}, and a corresponding reverse mapping;
   c) iteratively accessing each said portion in increments of size S bits, where S is set according to an application of said format-preserving ciphering;
   d) providing a key-stream with a block-cipher operating in a Counter (CTR) mode and iteratively accessing it in increments of said size S bits;
   e) determining a limiter value L as the difference of 2S and (2S modulo N);
   f) ignoring any said accessed key-stream value in said ciphering, if said key-stream value is greater than or equal to said limiter value L;
   g) allowing zero or more combinations of said S bits in each said portion to be skipped from said ciphering;
   h) encrypting each said portion in an encryption module by taking the sum of said forward mapping of said accessed portion and said accessed key-stream value, taking modulo 10 of said sum to produce a final sum, and taking said forward mapping of said final sum; and
   i) decrypting each said portion in a decryption module by taking the difference of said forward mapping of said accessed portion and said accessed key-stream value, taking modulo 10 of said difference, if said difference is less than 0 then adding N to said difference to produce a final difference, and taking said reverse mapping of said final difference.

2. The method of claim 1, where said format-preserving ciphering preserves an alpha-numeric format of said portions.

3. The method of claim 1, where S=8, representing said increments of said size S to be bytes.

4. The method of claim 1, where said combinations of said S bits in step 1(g) represent characters selected from the group consisting of binary characters, unprintable characters, dashes and delimiting characters.

5. The method of claim 1, where said allowable ciphertext values in said forward mapping and said reverse mapping are non-contiguous.

6. The method of claim 1, where said set {0 . . . N−1} in said forward mapping and said reverse mapping is in no particular order.

7. The method of claim 1, where said key-stream is derived using block-cipher in Counter (CTR) mode.

8. The method of claim 1, where said key-stream is an RC4 key-stream.

9. The method of claim 1, where said forward mapping maps said allowable ciphertext values as multi-byte values to said set {0 . . . N−1}, and said corresponding reverse mapping maps said set {0 . . . N−1} to corresponding said multi-byte allowable ciphertext values, and said size S divided by 8 equals to the number of bytes in each said multi-byte value.

10. The method of claim 1, where said format-preserving ciphering is used to implement a stream-cipher.

\* \* \* \* \*